United States Patent
Kadiri et al.

(10) Patent No.: US 11,438,812 B2
(45) Date of Patent: Sep. 6, 2022

(54) PERFORMING A COMBINATION OF HANDOVER TECHNIQUES

(71) Applicant: QUALCOMM Incorporated, San Diego, CA (US)

(72) Inventors: Prasad Reddy Kadiri, San Diego, CA (US); Amer Catovic, Carlsbad, CA (US); Umesh Phuyal, San Diego, CA (US); Masato Kitazoe, Hachiouji (JP); Karthika Paladugu, San Diego, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 56 days.

(21) Appl. No.: 16/450,771

(22) Filed: Jun. 24, 2019

(65) Prior Publication Data
US 2020/0022035 A1 Jan. 16, 2020

Related U.S. Application Data

(60) Provisional application No. 62/696,184, filed on Jul. 10, 2018.

(51) Int. Cl.
*H04W 36/00* (2009.01)
*H04L 69/18* (2022.01)

(52) U.S. Cl.
CPC ......... *H04W 36/0069* (2018.08); *H04L 69/18* (2013.01); *H04W 36/0072* (2013.01); *H04W 36/00837* (2018.08)

(58) Field of Classification Search
CPC ....... H04W 36/0069; H04W 36/00837; H04W 36/0072; H04W 36/18; H04W 36/28; H04W 36/36; H04W 36/08; H04L 69/18
See application file for complete search history.

(56) References Cited

U.S. PATENT DOCUMENTS

2018/0227805 A1* 8/2018 Jang .................. H04W 28/26
2018/0279193 A1* 9/2018 Park .................. H04W 76/27
(Continued)

FOREIGN PATENT DOCUMENTS

WO WO-2017138978 A1 * 8/2017 ............ H04W 36/18

OTHER PUBLICATIONS

Ericsson: "Conditional Handover-simulation results", 3GPP Draft; R2-180333—Conditional Handover-Simulation Results, 3rd Generation Partnership Project (3GPP), Mobile Competence Centre ; 650, Route Des Lucioles ; F-06921 Sophia-Antipolis Cedex; Fran, vol. RAN WG2, no. Athens, Greece; Feb. 26, 2018-Mar. 2, 2018, Feb. 16, 2018 (Feb. 16, 2018), XP051400472, 7 Pages, Retrieved from the Internet: URL:http://www.3gpp.org/ftp/tsg%5Fran/WG2%5FRL2/TSGR2%5F101/Docs/ [retrieved on Feb. 16, 2018].

(Continued)

*Primary Examiner* — Steven H Nguyen
(74) *Attorney, Agent, or Firm* — Harrity & Harrity, LLP

(57) ABSTRACT

Various aspects of the present disclosure generally relate to wireless communication. In some aspects, a user equipment (UE) may receive, from a source base station (BS), an indication that the UE is to perform a conditional handover from the source BS to a target BS and is to perform at least one of: a two protocol stack handover from the source BS to the target BS or a dual connectivity handover from the source BS to the target BS. The UE may perform the conditional handover and at least one of the two protocol stack handover or the dual connectivity handover based at least in part on the indication. Numerous other aspects are provided.

30 Claims, 9 Drawing Sheets

610 — Receive, from a source base station (BS), an indication that the UE is to perform a conditional handover from the source BS to a target BS and is to perform at least one of: a two protocol stack handover from the source BS to the target BS, or a dual connectivity handover from the source BS to the target BS 620 — Perform the conditional handover and at least one of the two protocol stack handover or the dual connectivity handover based at least in part on the indication

(56) References Cited

U.S. PATENT DOCUMENTS

| | | | |
|---|---|---|---|
| 2018/0317137 A1* | 11/2018 | Loehr | H04W 36/023 |
| 2019/0037457 A1* | 1/2019 | Jang | H04W 36/08 |
| 2019/0223073 A1* | 7/2019 | Chen | H04W 76/18 |
| 2019/0281511 A1* | 9/2019 | Susitaival | H04W 36/0016 |
| 2019/0380081 A1* | 12/2019 | Chang | H04W 36/18 |
| 2019/0387438 A1* | 12/2019 | Chang | H04W 36/0055 |
| 2019/0387440 A1* | 12/2019 | Yiu | H04W 36/0072 |
| 2020/0008113 A1* | 1/2020 | Chen | H04W 36/0038 |
| 2020/0022055 A1* | 1/2020 | Yan | H04W 76/11 |
| 2020/0084683 A1* | 3/2020 | Moosavi | H04W 36/24 |
| 2020/0120548 A1* | 4/2020 | Jin | H04W 36/18 |
| 2020/0374773 A1* | 11/2020 | Zhang | H04W 28/0252 |

OTHER PUBLICATIONS

LG Electronics Inc: "Conditional handover Procedure", 3GPP Draft; R2-1802693 Conditional Han Dover Procedure, 3rd Generation Partnership Project (3GPP), Mobile Competence Centre, 650, Route Des Lucioles, F-06921 Sophia-Antipolis Cedex, France, vol. RAN WG2, no. Athens. Greece; Feb. 26, 2018-Mar. 2, 2018, Feb. 14, 2018 (Feb. 14, 2018), XP051399297, 3 Pages, Retrieved from the Internet: URL: http://www.3gpp.org/ftp/tsg%5Fran/WG2%5FRL2/TSGR2%5F101/Docs/ [retrieved on Feb. 14, 2018].

QUALCOMM Incorporated: "Conditional HO design considerations", LuUcioles ; F-06921 Sophia-Antipolis Cedex; France, vol. RAN WG2, no. Xi'an, China; Apr. 8, 2019-Apr. 12, 2019, Apr. 6, 2019 (Apr. 6, 2019), XP051700993, 4 Pages, Retrieved from the Internet: URL:http://www.3gpp.org/ftp/Meetings%5F3GPP%5FSYNC/RAN2/Docs/R2%2D1903651%2Ezip [retrieved on Apr. 6, 2019].

QUALCOMM Incorporated: "Conditional HO to improve mobility robustness", 3GPP Draft; R2-1905788, 3rd Generation Partnership Project (3GPP), Mobile Competence Centre ; 650, Route Des-Lucioles; F-06921 Sophia-Antipolis Cedex; France, vol. RAN WG2, no. Reno, Nevada; May 13, 2019-May 17, 2019, May 13, 2019 (May 13, 2019), XP051729287, 3 Pages, Retrieved from the Internet: URL:http://www.3gpp.org/ftp/Meetings%5F3GPP%5FSYNC/RAN2/Docs/R2%2D1905788%2Ezip [retrieved on 2May 13, 2019].

LG Electronics Inc: "Support of DC based handover with conditional handover for 0ms interruption", 3GPP Draft; R2-1802541 Support of DC Based Handover With Conditional Handover for 0ms Interruption, 3rd Generation Partnership Project (3GPP), Mobile Competence Centre ;650, Route Des Lucioles ; F-06, vol. RAN WG2, no. Athens, Greece; Feb. 26, 2018-Mar. 2, 2018, Feb. 14, 2018 (Feb. 14, 2018), XP051399252, 3 Pages, Retrieved from the Internet: URL:http://www.3gpp.org/ftp/tsg%5Fran/WG2%5FRL2/TSGR2%5F101/Docs/ [retrieved on Feb. 14, 2018].

QUALCOMM Incorporated: "Control Plane handling and procedures to support Dual Connectivity Role Switch (DCRS) based HO", 3GPP Draft; R2-1905783, 3rd Generation Partnership Project (3GPP), Mobile Competence Centre ; 650, Route Des Lucioles ; F-06921 Sophia-Antipolis Cedex; France, vol. RAN WG2, no. Reno, Nevada; May 13, 2019-May 17, 2019, MAY 13, 2019 (Feb. 14, 2018), XP051729282, 4 Pages, Retrieved from the Internet: URL:http://www.3gpp.org/ftp/Meetings%5F3GPP%5FSYNC/RAN2/Docs/R2%2D1905783%2Ezip [retrieved on May 13, 2019].

QUALCOMM Incorporated: "LTE Conditional HO design considerations", 3GPP Draft; R2-1906375 LTE Conditional Handover Design Considerations V1, 3rd Generation Partnership Project—(3GPP), Mobile Competence Centre; 650, Route Des Lucioles ; F-06921 Sophia-Antipolis Cedex, vol. RAN WG2, no. Reno, USA; May 13, 2019-May 17, 2019, May 13, 2019 (May 13, 2019), XP051729840, 8 Pages, Retrieved from the Internet: URL:http://www.3gpp.org/ftp/Meetings%5F3GPP%5FSYNC/RAN2/Docs/R2%2D1906375%2Ezip [retrieved on May 13, 2019].

QUALCOMM Incorporated: "LTE Mobility Robustness Enhancements", 3GPP Draft; R2-1904659_LTE_Mobility_Robustness_Enhancement_V1.DOCX, 3rd Generation Partnership Project (3GPP), Mobile Competence Centre ;650, Route Des Lucioles ; F-06921 Sophia-Antipolis Cedex ; FRAN, vol. RAN WG2, no. Xian, China; Apr. 8, 2019-Apr. 12, 2019, Apr. 6, 2019 (Apr. 6, 2019), XP051701945, 3 Pages, Retrieved from the Internet: URL:http://www.3gpp.org/ftp/Meetings%5F3GPP%5FSYNC/RAN2/Docs/R2%2D1904659%2Ezip [retrieved on Apr. 6, 2019].

Ericsson: "Conditional Handover-simulation results", 3GPP Draft; R2-1803337—Conditional Handover—Simulation Results, 3rd Generation Partnership Project (3GPP), Mobile Competence Centre; 650, Route Des Lucioles; F-06921 Sophia-Antipolis Cedex; Fran, vol. RAN WG2, No. Athens, Greece; Feb. 26, 2018-Mar. 2, 2018, Feb. 16, 2018 (Feb. 16, 2018), XP051400472, 7 Pages, Retrieved from the Internet: URL:http://www.3gpp.org/ftp/tsg%5Fran/WG2%5FRL2/TSGR2%5F101/Docs/ [retrieved on Feb. 16, 2018].

ETRI: "Baseline Handover: Basic HO vs. Conditional Ho", 3GPP Draft; R2-1807674—Baseline Handover, 3rd Generation Partnership Project (3GPP), Mobile Competence Centre; 650, Route Des Lucioles; F-06921 Sophia-Antipolis Cedex; France, vol. RAN WG2, No. Busan, Korea; May 21, 2018-May 25, 2018, May 20, 2018 (May 20, 2018), XP051444027, 4 Pages, Retrieved from the Internet: URL:http://www.3gpp.org/ftp/Meetings%5F3GPP%5FSYNC/RAN2/Docs/ [retrieved on May 20, 2018].

International Search Report and Written Opinion—PCT/US2019/039037—ISA/EPO—dated Aug. 22, 2019.

KT Corp: "Discussion on conditional handover", 3GPP Draft; R2-1709238, 3rd Generation Partnership Project (3GPP), Mobile Competence Centre; 650, Route Des Lucioles; F-06921 Sophia-Antipolis Cedex; France, vol. RAN WG2, No. Berlin, Germany; Aug. 21, 2017-Aug. 25, 2017, Aug. 20, 2017 (Aug. 20, 2017), XP051319002, 2 Pages, Retrieved from the Internet: URL:http://www.3gpp.org/ftp/Meetings_3GPP_SYNC/RAN2/Docs/ [retrieved on Aug. 20, 2017].

Qualcomm Incorporated: "Conditional HO design considerations", 3GPP Draft; R2-1903651, 3rd Generation Partnership Project (3GPP), Mobile Competence Centre; 650, Route Des Lucioles; F-06921 Sophia-Antipolis Cedex; France, vol. RAN WG2, No. Xi'an, China; Apr. 8, 2019-Apr. 12, 2019, Apr. 6, 2019 (Apr. 6, 2019), XP051700993, 4 Pages, Retrieved from the Internet: URL:http://www.3gpp.org/ftp/Meetings%5F3GPP%5FSYNC/RAN2/Docs/R2%2D1903651%2Ezip [retrieved on Apr. 6, 2019].

Samsung: "Regarding Ping-Pong issue of Conditional Handover", 3GPP Draft; R2-1808449 Regarding Ping-Pong Issue of Conditional Handover, 3rd Generation Partnership Project (3GPP), Mobile Competence Centre; 650, Route Des Lucioles; F-06921 Sophia-Antipolis Cedex, vol. RAN WG2, No. Busan, Korea; May 21, 2018-May 25, 2018, May 20, 2018 (May 20, 2018), XP051444722, 2 Pages, Retrieved from the Internet: URL:http://www.3gpp.org/ftp/Meetings%5F3GPP%5FSYNC/RAN2/Docs/ [retrieved on May 20, 2018].

* cited by examiner

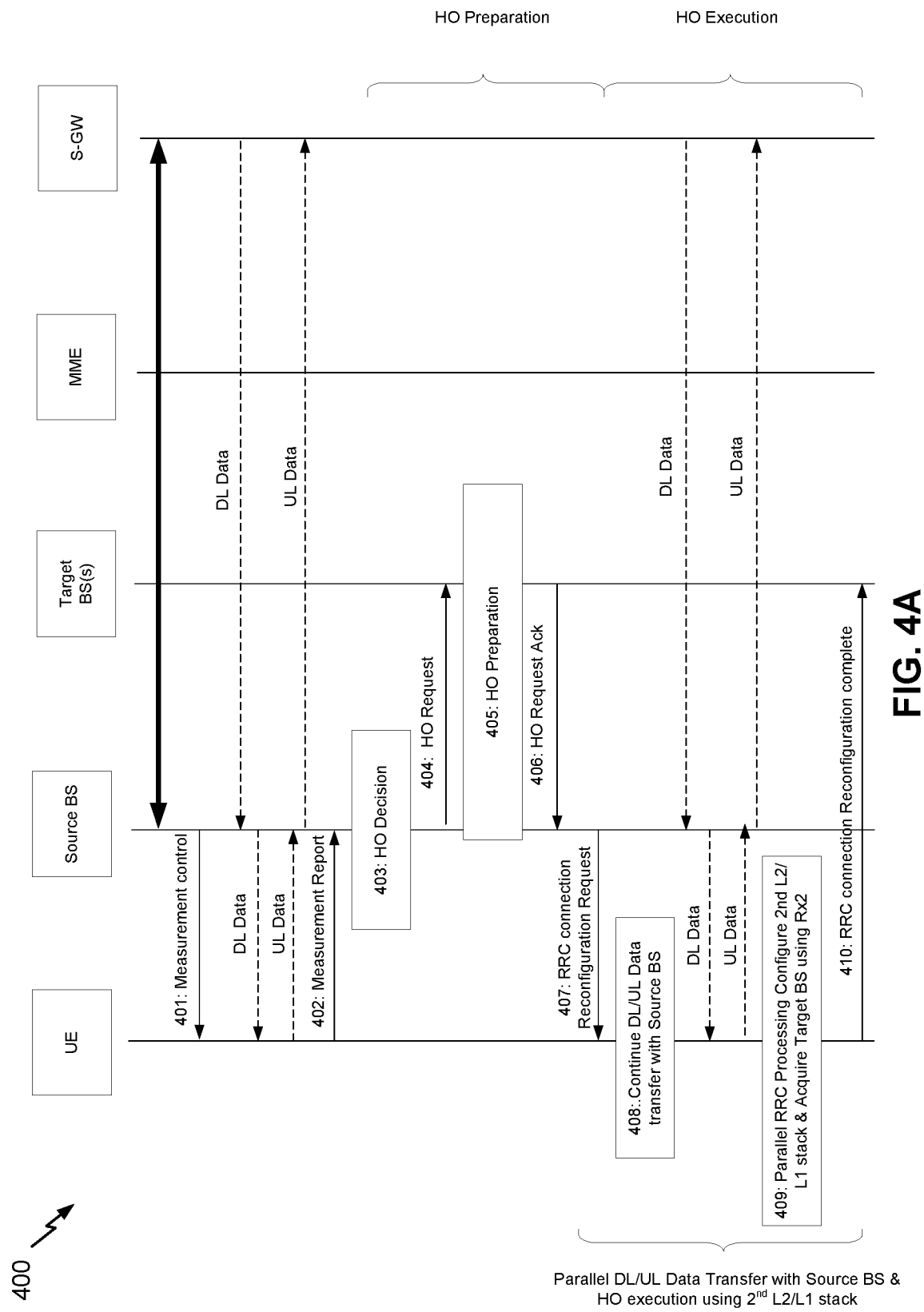

PERFORMING A COMBINATION OF HANDOVER TECHNIQUES

CROSS-REFERENCE TO RELATED APPLICATIONS UNDER 35 U.S.C. § 119

This application claims priority to U.S. Provisional Patent Application No. 62/696,184, filed on Jul. 10, 2018, entitled "TECHNIQUES AND APPARATUSES FOR PERFORMING A COMBINATION OF HANDOVER TECHNIQUES," which is hereby expressly incorporated by reference herein.

FIELD OF THE DISCLOSURE

Aspects of the present disclosure generally relate to wireless communication and to techniques and apparatuses for performing a combination of handover techniques.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving, from a source base station (BS), an indication that the UE is to perform a conditional handover from the source BS to a target BS and is to perform at least one of: a two protocol stack handover from the source BS to the target BS, or a dual connectivity handover from the source BS to the target BS; and performing the conditional handover and at least one of the two protocol stack handover or the dual connectivity handover based at least in part on the indication.

In some aspects, a method of wireless communication, performed by a source base station (BS), may include determining that a user equipment (UE) is to perform a conditional handover from the source BS to a target BS and is to perform at least one of: a two protocol stack handover from the source BS to the target BS, or a dual connectivity handover from the source BS to the target BS; and transmitting, to the UE, an indication that indicates that the UE is to perform the conditional handover and at least one of the two protocol stack handover or the dual connectivity handover.

In some aspects, a UE for wireless communication may include memory and one or more processors operatively coupled to the memory. The memory and the one or more processors may be configured to receive, from a source base station (BS), an indication that the UE is to perform a conditional handover from the source BS to a target BS and is to perform at least one of: a two protocol stack handover from the source BS to the target BS, or a dual connectivity handover from the source BS to the target BS; and perform the conditional handover and at least one of the two protocol stack handover or the dual connectivity handover based at least in part on the indication.

In some aspects, a source BS for wireless communication may include memory and one or more processors operatively coupled to the memory. The memory and the one or more processors may be configured to determine that a user equipment (UE) is to perform a conditional handover from the source BS to a target BS and is to perform at least one of: a two protocol stack handover from the source BS to the target BS, or a dual connectivity handover from the source BS to the target BS; and transmit, to the UE, an indication that indicates that the UE is to perform the conditional handover and at least one of the two protocol stack handover or the dual connectivity handover.

In some aspects, a non-transitory computer-readable medium may store one or more instructions for wireless communication. The one or more instructions, when executed by one or more processors of a UE, may cause the one or more processors to receive, from a source base station (BS), an indication that the UE is to perform a conditional handover from the source BS to a target BS and is to perform at least one of: a two protocol stack handover from the source BS to the target BS, or a dual connectivity handover from the source BS to the target BS; and perform the conditional handover and at least one of the two protocol stack handover or the dual connectivity handover based at least in part on the indication.

In some aspects, a non-transitory computer-readable medium may store one or more instructions for wireless communication. The one or more instructions, when executed by one or more processors of a source base station (BS), may cause the one or more processors to determine that a user equipment (UE) is to perform a conditional handover from the source BS to a target BS and is to perform at least one of: a two protocol stack handover from the source BS to the target BS, or a dual connectivity handover from the source BS to the target BS; and transmit, to the UE, an indication that indicates that the UE is to perform the conditional handover and at least one of the two protocol stack handover or the dual connectivity handover.

In some aspects, a UE (e.g., an apparatus) for wireless communication may include means for receiving, from a source base station (BS), an indication that the UE is to perform a conditional handover from the source BS to a target BS and is to perform at least one of: a two protocol stack handover from the source BS to the target BS, or a dual connectivity handover from the source BS to the target BS; and means for performing the conditional handover and at least one of the two protocol stack handover or the dual connectivity handover based at least in part on the indication.

In some aspects, a source BS (e.g., an apparatus) for wireless communication may include means for determining that a user equipment (UE) is to perform a conditional handover from the source BS to a target BS and is to perform at least one of: a two protocol stack handover from the source BS to the target BS, or a dual connectivity handover from the source BS to the target BS; and means for transmitting, to the UE, an indication that indicates that the UE is to perform the conditional handover and at least one of the two protocol stack handover or the dual connectivity handover.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 4A and 4B are diagrams of a call flow for performing a combination of handover techniques, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
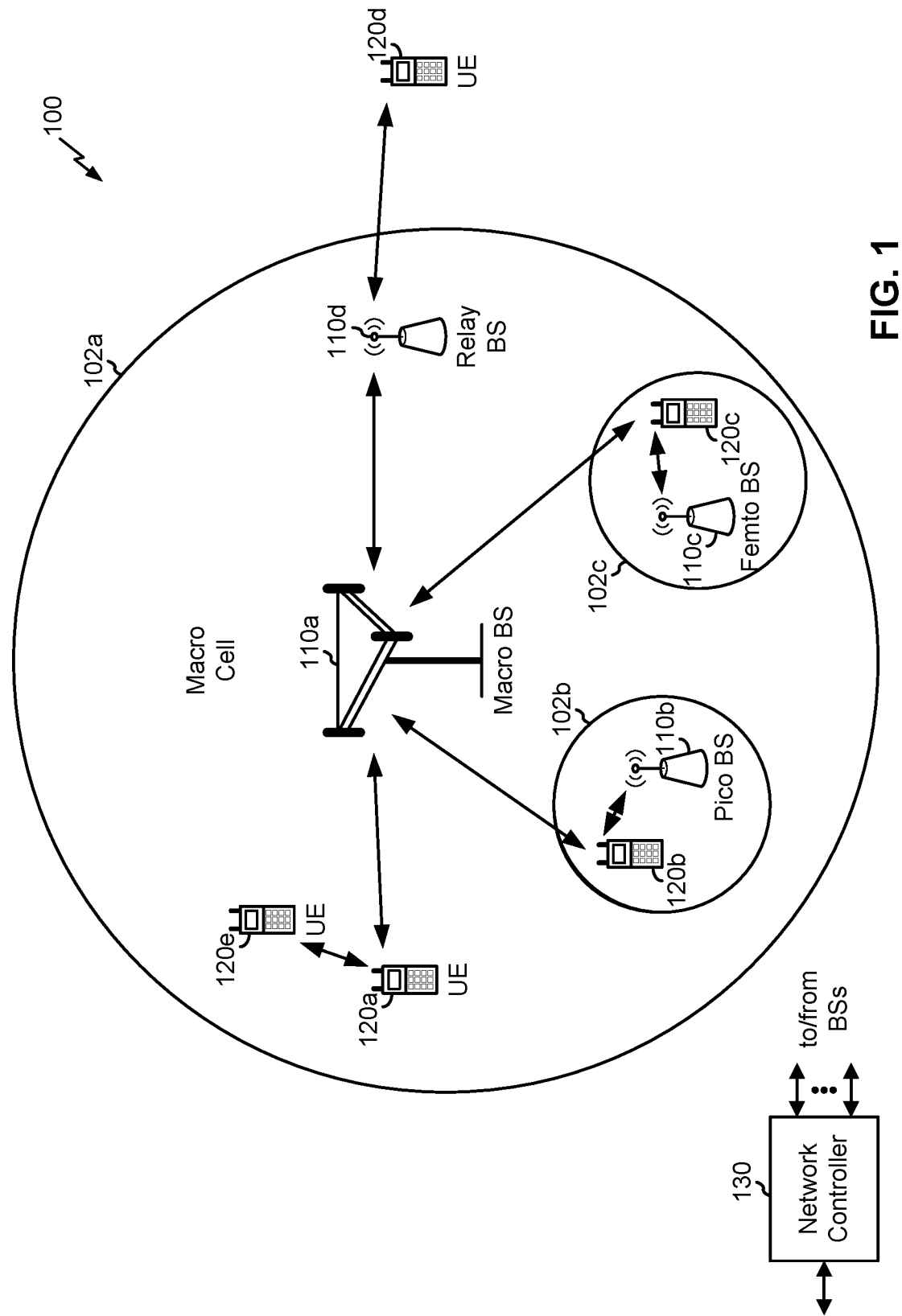
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples are possible and may differ from what was described with regard to FIG. 1.

Figure 2:
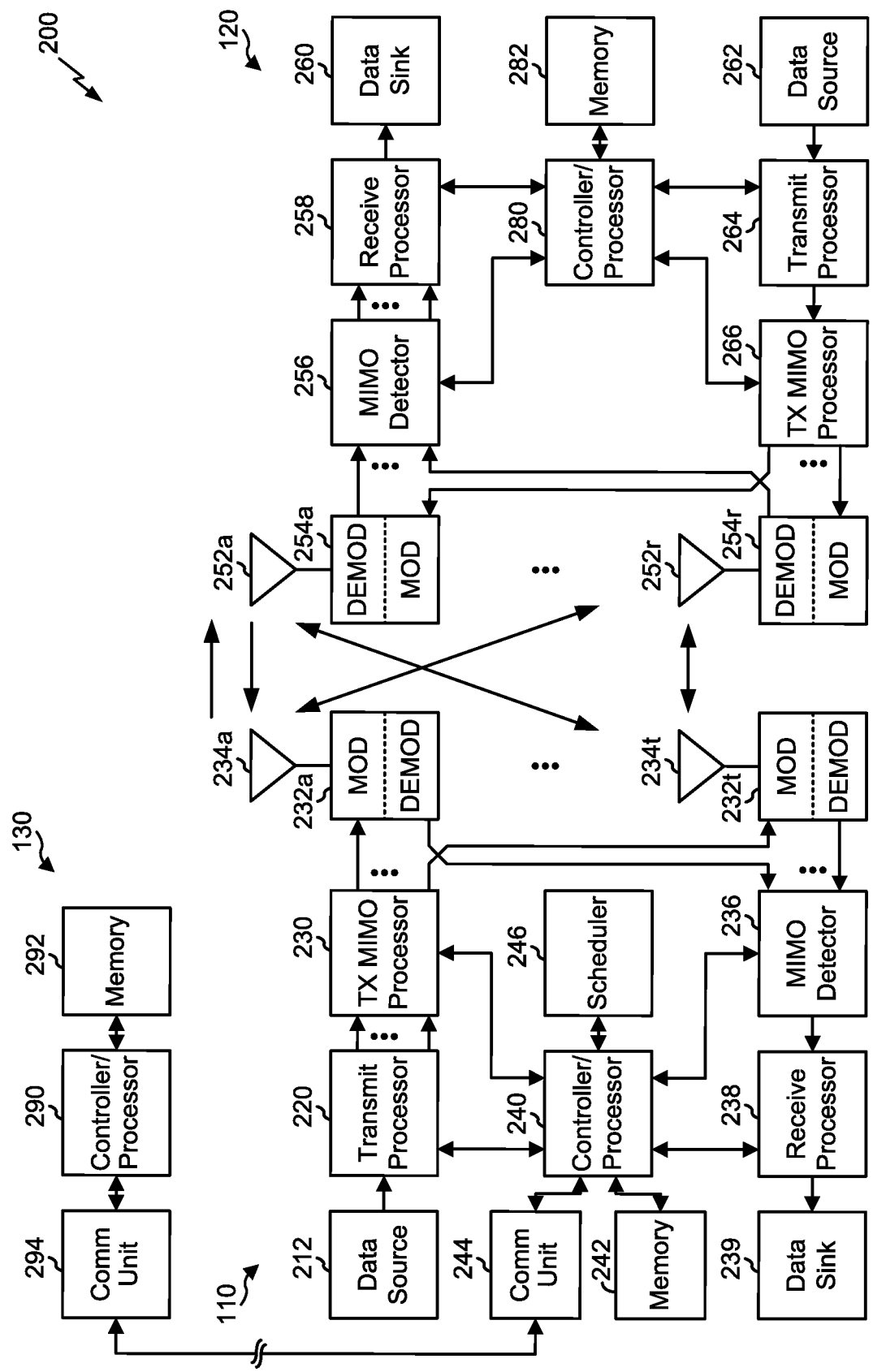
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with performing a combination of handover techniques, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving, from a source base station (BS), an indication that the UE is to perform a conditional handover from the source BS to a target BS and is to perform at least one of: a two protocol stack handover from the source BS to the target BS, or a dual connectivity handover from the source BS to the target BS; means for performing the conditional handover and at least one of the two protocol stack handover or the dual connectivity handover based at least in part on the indication; and/or the like. In some aspects, such means may include one or more components of UE 120 described in connection with FIG. 2.

In some aspects, base station 110 may include means for determining that a user equipment (UE) is to perform a conditional handover from the source BS to a target BS and is to perform at least one of: a two protocol stack handover from the source BS to the target BS, or a dual connectivity handover from the source BS to the target BS; means for transmitting, to the UE, an indication that indicates that the UE is to perform the conditional handover and at least one of the two protocol stack handover or the dual connectivity handover; and/or the like. In some aspects, such means may include one or more components of base station 110 described in connection with FIG. 2.

As indicated above, FIG. 2 is provided merely as an example. Other examples are possible and may differ from what was described with regard to FIG. 2.

A source BS (e.g., a serving BS, etc.) may perform a handover of a UE to a target BS. For example, a UE in motion may be handed over from one BS to another as the UE moves through cells provided by different BSs.

Mobility enhancements for UE handover may have certain design targets, such as approximately zero millisecond handover interruption latency (e.g., for real-time gaming applications and other ultra-reliable low latency communications (URLLC) applications), a handover reliability, reduced handover ping-pongs, and/or the like. To satisfy these design targets, various types of handover enhancements may be used. For example, a dual connectivity handover may be used, an enhanced make-before-break (MBB) handover (e.g., a low latency or a zero latency handover, a two protocol stack handover, and/or the like), and/or a conditional handover may be used to improve a signaling reliability and/or to reduce ping-pongs associated with a handover. A two protocol stack handover may be referred to as a dual active protocol stack-based handover.

Continuing with the previous examples, these techniques may include dual Rx/dual Tx, dual Rx/single Tx, single Rx/single Tx, dual PHY, dual L2 stack (e.g., media access control (MAC), radio link control (RLC), packet data convergence protocol (PDCP), and/or the like) during handover, security key switch during handover, PDCP sequence number continuity after handover, support for both intra-frequency and inter-frequency BS handover, support for synchronous and asynchronous BS handover, random access channel (RACH)-based handover, and/or the like. Continuing still with the previous example, a handover according to these techniques may include a multi-phase handover where two protocol stacks are used to handover the UE from a source BS to a target BS (e.g., a first protocol stack is used for continued communications with the source BS while the second protocol stack is used for handover of the UE from the source BS to the target BS). While these techniques may facilitate satisfaction of design targets related to reliability and/or latency, these techniques may experience a threshold handover failure rate, a threshold amount of ping-pong handover signaling, and/or the like.

Some techniques and apparatuses described herein provide for using a combination of handover techniques to perform a handover of a UE from a source BS to a target BS. For example, some techniques and apparatuses described herein provide a UE and/or a source BS that are capable of using a combination of a two protocol stack handover (sometimes referred to as a dual active protocol stack-based handover), a conditional handover, and/or a dual connectivity handover to perform a handover of the UE from the source BS to a target BS. This reduces or eliminates performance issues related to using any of these handover techniques independently. For example, using a combination of a conditional handover and a two protocol stack handover, or a combination of a conditional handover and a dual connectivity handover, may improve reliability relative to using the two protocol stack handover or the dual connectivity handover independently. Additionally, or alternatively, and as another example, these combinations may reduce or eliminate handover ping-pongs and/or radio link failures. In addition, this further reduces a latency associated with performing a handover relative to using various types of handover techniques separately.

Figure 3:
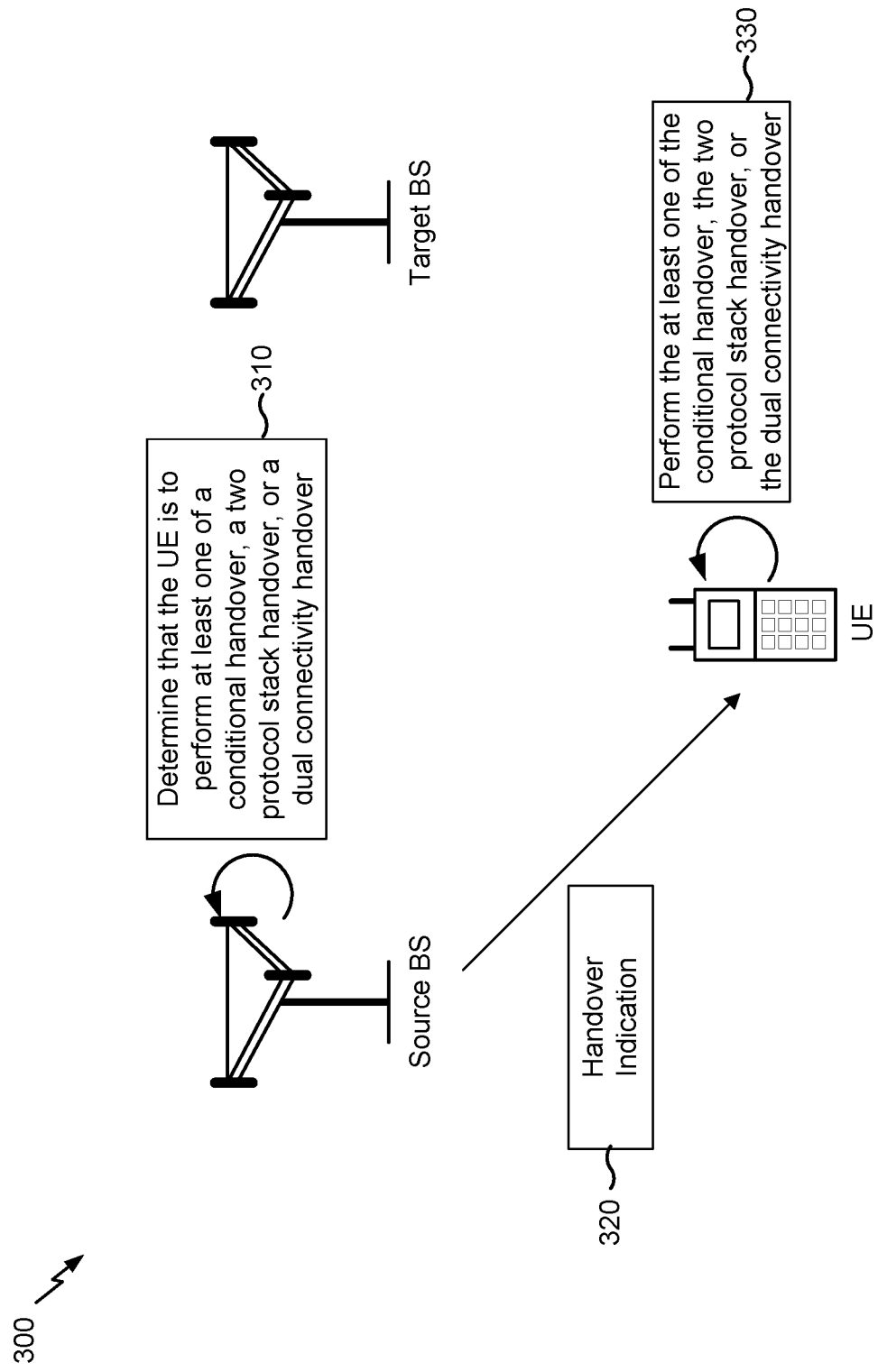
FIG. 3 is a diagram illustrating an example of performing a combination of handover techniques, in accordance with various aspects of the present disclosure.

FIG. 3 is a diagram illustrating an example 300 of performing a combination of handover techniques, in accordance with various aspects of the present disclosure. As shown in FIG. 3, example 300 may include a UE (e.g., UE 120), a source BS (e.g., BS 110) (e.g., to which the UE is connected via a source connection), and a target BS (e.g., BS 110) (e.g., to which the is being handed over from the source BS and/or to which the UE is to be connected via a target connection).

As shown by reference number 310, the source BS may determine that the UE is to perform at least one of a conditional handover, a two protocol stack handover, or a dual connectivity handover. In some aspects, a conditional handover may include a handover where a handover command (e.g., a radio resource configuration (RRC) connection reconfiguration that includes mobility control information) is associated with a condition. For example, when the UE determines that the condition is satisfied, the UE may perform a handover in accordance with the handover command. In some aspects, a two protocol stack handover may include a multi-phase handover where two protocol stacks are used to handover the UE from a source BS to a target BS (e.g., a first protocol stack is used for continued communications with the source BS while a second protocol stack is used for handover of the UE from the source BS to the target BS), and may sometimes be referred to as a dual active protocol stack-based handover. In some aspects, a dual connectivity handover may include a handover where a UE is simultaneously connected to a source BS as a primary BS and to a target BS as a secondary BS, and where the source BS and the target BS communicate with each other to exchange roles (e.g., the source BS becomes the secondary BS and the target BS becomes the primary BS).

In some aspects, the source BS may receive, from the UE, capability information. For example, the capability information may identify a capability of the UE to perform the at least one of the conditional handover, the two protocol stack handover (e.g., a dual active protocol stack-based handover), or the dual connectivity handover. In some aspects, the source BS may determine that the UE is to perform the at least one of the conditional handover, the two protocol stack handover, or the dual connectivity handover based at least in part on receiving the capability information.

As shown by reference number 320, the source BS may transmit, and the UE may receive, a handover indication. For example, the handover indication may indicate that the UE is to perform the at least one of the conditional handover, the two protocol stack handover, or the dual connectivity handover. Continuing with the previous example, the handover indication may indicate that the UE is to perform the conditional handover, is to perform the two protocol stack handover, is to perform the dual connectivity handover, is to perform a combination of the conditional handover and the two protocol stack handover, is to perform a combination of the conditional handover and the dual connectivity handover, is to perform a combination of the dual connectivity handover and the two stack protocol handover, and/or the like.

In some aspects, the handover indication may be included in a radio resource control (RRC) connection reconfiguration request. For example, the RRC connection reconfiguration request may be transmitted from the source BS to the UE. In some aspects, the RRC connection reconfiguration request may include a set of conditions that the UE is to use to select a target BS. For example, the UE may select a target BS based at least in part on satisfaction of one or more of the set of conditions, as described elsewhere herein.

In some aspects, the handover indication may be based at least in part on an indication received from a mobility management entity (MME). For example, the indication from the MME may be based at least in part on a type of application associated with the UE, a quality of service level associated with the UE, an access point network (APN) type associated with a subscription profile of the UE, and/or the like.

In some aspects, the source BS may determine a priority (e.g., prioritization) of the at least one of the conditional handover, the two protocol stack handover, or the dual connectivity handover. For example, the source BS may determine the priority prior to transmitting the handover indication (e.g., the priority may indicate that a particular handover technique, or combination of handover techniques, is to be used rather than another handover technique, or combination of techniques). In some aspects, the source BS may determine the priority based at least in part on the indication from the MME. For example, the indication from the MME may identify particular applications as needing a threshold reliability, may identify the UE as needing a threshold reliability and/or latency (e.g., a quality of service), and/or the like.

In some aspects, the source BS may perform a handover decision. For example, the source BS may perform the handover decision for the UE based at least in part on a measurement report received from the UE and/or prior to transmitting the handover indication. Additionally, or alternatively, the source BS may determine that the UE is to perform the combination of the conditional handover and the two protocol stack handover, or the combination of the conditional handover and the dual connectivity handover. For example, the source BS may determine that the UE is to perform the combination of the conditional handover and the two protocol stack handover, or the combination of the conditional handover and the dual connectivity handover, based at least in part on performing the handover decision (e.g., after performing the handover decision and/or prior to transmitting the handover indication). Additionally, or alternatively, the source BS may perform a respective handover preparation with multiple target BSs, of a set of target BSs. For example, the source BS, based at least in part on determining that the UE is to perform the combination of the conditional handover and the two protocol stack handover, or the combination of the conditional handover and the dual connectivity handover, may perform a first handover preparation with a first target BS and a second handover preparation with a second target BS. For example, the source BS may transmit, to one or more target BSs, information that identifies whether the UE is to perform a combination of the conditional handover and the two protocol stack handover or whether the UE is to perform a combination of the conditional handover and the dual connectivity handover.

As shown by reference number 330, the UE may perform the at least one of the conditional handover, the two protocol stack handover, or the dual connectivity handover. For example, the UE may perform the at least one of the conditional handover, the two protocol stack handover, or the dual connectivity handover based at least in part on the handover indication received from the source BS.

In some aspects, the UE may perform a combination of the conditional handover and the two protocol stack handover, or a combination of the conditional handover and the two protocol stack handover, based at least in part on the indication. For example, the UE may perform the conditional handover to select the target BS, and may perform the two protocol stack handover, or the dual connectivity handover, to complete a handover of the UE from the source BS to the target BS (e.g., while a source connection between the UE and the source BS and a target connection between the UE and the target BS are active, where the source BS and the target BS exchange roles, and/or the like).

In some aspects, the UE may perform the conditional handover and not the two protocol stack handover or the dual connectivity handover based at least in part on the indication. For example, the UE may perform the conditional handover from the source BS to the target BS. In some aspects, the UE may perform the two protocol stack handover and not the conditional handover or the dual connectivity handover based at least in part on the indication. For example, the UE may perform the two protocol stack handover from the source BS to the target BS. In some aspects, the UE may perform the dual connectivity handover and not the conditional handover or the two protocol stack handover based at least in part on the indication. For example, the UE may perform the dual connectivity handover from the source BS to the target BS.

In some aspects, the UE may select a target BS prior to performing a handover. For example, and for a conditional handover, the UE may select a target BS from a set of target BSs. Additionally, or alternatively, and as another example, the UE may select a particular target BS based at least in part on a handover decision by the source BS.

As indicated above, FIG. 3 is provided as an example. Other examples are possible and may differ from what was described with respect to FIG. 300.

Figure 4B:
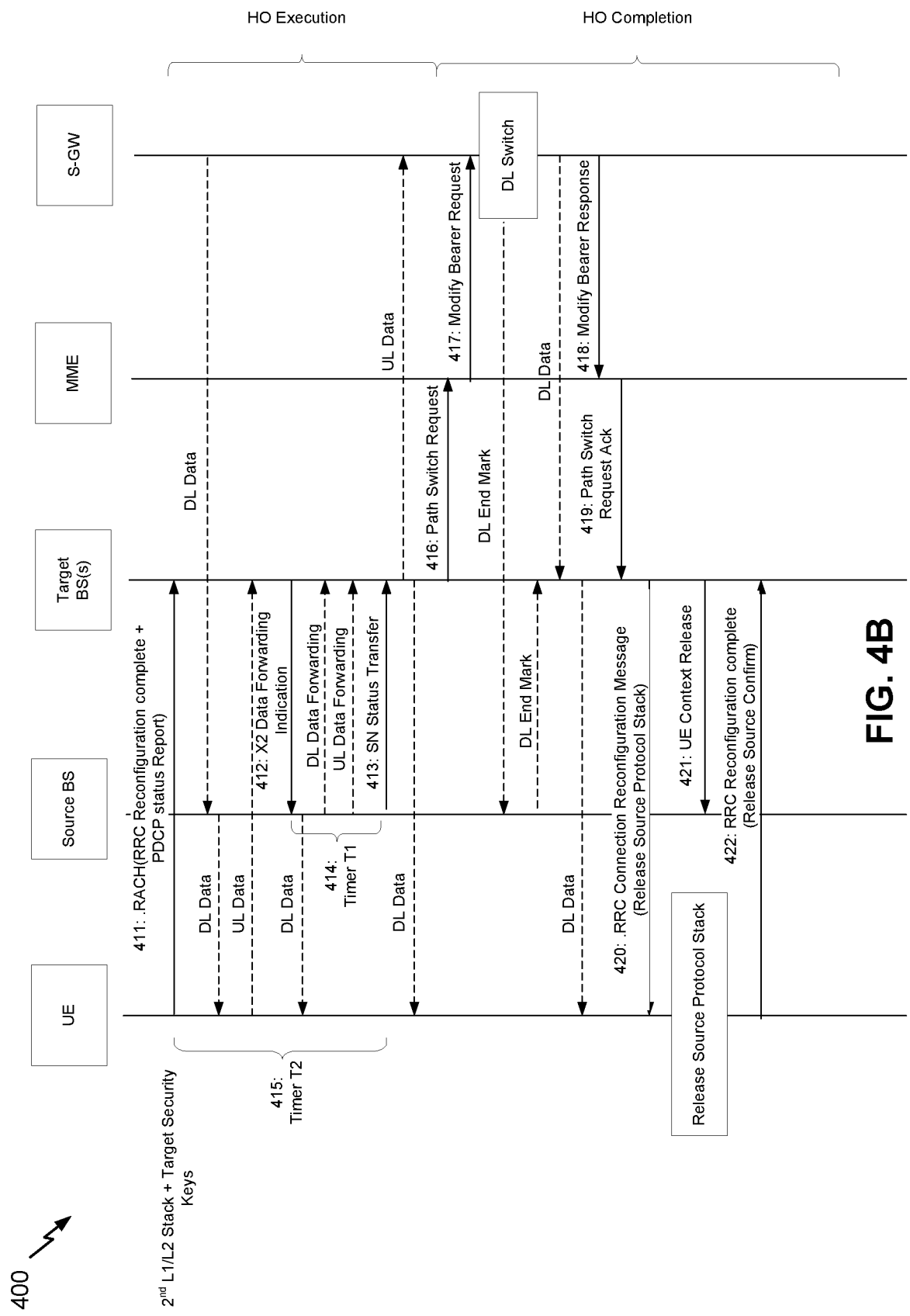

FIGS. 4A and 4B are diagrams of a call flow 400 for performing a combination of handover techniques, in accordance with various aspects of the present disclosure. Specifically, FIGS. 4A and 4B show an example of performing a combination of a conditional handover and a two protocol stack handover (e.g., a dual active protocol stack-based handover).

As shown by reference number 401, the source BS may provide a measurement control message to the UE. The measurement control message may indicate for the UE to determine measurement for handover of the UE. In some aspects, the measurement control message may indicate to determine a particular measurement report, such as an A3 measurement report.

As shown by reference number 402, the UE may provide a measurement report to the BS in connection with the measurement control message. For example, the UE may determine measurements for cells that cover the UE. Assume that the target BS is identified based at least in part on the measurements. Assume that the target BS is associated with a threshold measurement value so that the source BS is to configure handover of the UE from the source BS to the target BS. For example, the threshold measurement value may be smaller than a legacy measurement value (e.g., a measurement value for non-low-latency handover), as described in more detail elsewhere herein.

As shown by reference number 403, the source BS may perform a handover decision based at least in part on the measurement report. For example, the source BS may determine that the UE is to be handed over to the target BS based at least in part on the measurement report. As shown by reference number 404, the source BS may provide a handover request to the target BS in connection with performing the handover decision. For example, the handover request may identify the UE and may indicate that the UE is to be handed over to the target BS.

As shown by reference number 405, the source BS may perform a respective handover (HO) preparation with a set of target BSs. For example, and when the UE is to perform a combination of a conditional handover and another handover (e.g., a dual connectivity handover or a two protocol stack handover) the source BS may perform a first HO preparation with a first target BS, may perform a second HO preparation with a second target BS, and so forth. A source BS may perform HO preparation with multiple target BSs simultaneously to reduce an amount of time needed for the HO preparation process. In some aspects, performing a HO preparation may include providing a UE context for the UE to the set of target BSs, causing the set of target BSs to allocate resources (e.g., time frequency resources, bearer configuration, RACH resources, etc.) for a handover of the UE, and/or the like. For example, the source BS may transmit, to one or more target BSs, information that identifies whether the UE is to perform a combination of the conditional handover and the two protocol stack handover or whether the UE is to perform a combination of the conditional handover and the dual connectivity handover.

As shown by reference number 406, the target BS may provide a handover request acknowledgment (ACK) to the source BS. For example, the target BS may provide the handover request ACK to indicate that the target BS accepts the handover of the UE and provides needed HO configuration information.

As shown by reference number 407, the source BS may provide an RRC connection reconfiguration request to the UE. The RRC reconfiguration request may indicate that the UE is to be handed over from the source BS to the target BS. In some aspects, the source BS may provide the RRC connection reconfiguration request to a source protocol stack of the UE.

As shown by reference number 408, the UE (e.g., the source protocol stack of the UE) may continue downlink/uplink data communications (e.g., transfer) with the source BS. For example, the UE may continue to receive downlink data and to transmit uplink data to the source BS. In this way, communications of the UE with the source BS may not be interrupted, thereby reducing latency associated with interruption of communications of the UE during handover.

As shown by reference number 409, the UE may perform parallel RRC processing to configure the target protocol stack (e.g., a second L2/L1 stack) and to acquire the target BS using a second receive antenna of the UE (e.g., Rx2). For example, the UE may configure (e.g., generate, activate, etc.) the target protocol stack to perform the handover. In some aspects, the UE may configure the target protocol stack based at least in part on receiving the RRC reconfiguration request. In this way, the UE may perform RRC processing to configure the handover using the target protocol stack while (e.g., in parallel) maintaining communications with the source BS.

In some aspects, the target protocol stack of the UE may synchronize with the target BS. In some aspects, the target protocol stack of the UE may acquire the target BS.

As shown by reference number 410, after the UE determines conditional HO thresholds are satisfied for a target BS, then the UE may apply HO configuration provided in an RRC connection reconfiguration message and may send a message to the target BS indicating that RRC connection reconfiguration (e.g., handover) of the UE is complete. For example, the second protocol stack may provide the message indicating that RRC connection reconfiguration of the UE is complete.

As shown in FIG. 4B and by reference number 411, in some aspects, the UE (e.g., the target protocol stack) may provide random access information to the target BS. For example, the random access information may indicate that RRC connection reconfiguration of the UE is complete. Additionally, or alternatively, the UE may send a PDCP status report to the target BS. By providing random access information (e.g., using a random access channel (RACH)), resources of the UE are conserved that would otherwise be used to perform grant-based initial access to the target BS. As shown, the RACH information may be sent to the target BS (e.g., as part of a RACH procedure) before a connection with the source BS is released.

As shown, at this point, the UE may provide uplink data to the target BS. For example, the UE may be associated with an uplink connection with the target BS, and may provide the uplink data to the target BS. In some aspects, the UE may be associated with a single transmit chain. For example, the UE may tune the single transmit chain from the source BS to the target BS to provide the uplink data to the target BS. In this way, the UE conserves resources and reduces latency that would be associated with providing the uplink data to only the source BS, or the source BS and the target BS. In some aspects, the UE may provide the uplink data to the source BS and to the target BS, which improves robustness of the uplink data.

As shown by reference number 412, the target BS may provide a data forwarding notification to the source BS. For example, the data forwarding notification may include an X2 data forwarding notification for an X2 interface between the target BS and the source BS and/or the like. The data forwarding notification may indicate that the source BS is to forward at least a portion of downlink data of the UE to the target BS. For a more detailed description of such data forwarding, refer to FIGS. 5A and 5B, below. By configuring data forwarding between the source BS and the target BS, the target BS reduces latency associated with the handover process pursuant to lost or dropped data.

As shown by reference number 413, the source BS may provide sequence number (SN) information (e.g., an SN status transfer) to the target BS. For example, in a subsequent step of this call flow, the source BS may cease allocating downlink PDCP SNs. If the source BS does not coordinate SNs for the downlink data (e.g., PDCP SNs and/or the like), collisions may occur between downlink data of the source BS and downlink data of the target BS. This may increase latency of the handover process and/or lead to dropped traffic.

As shown by reference number 414, the source BS may be associated with a first timer (e.g., timer 1). The first timer may identify a backhaul delay period. For example, the first timer may identify a length of time after which the source BS is to stop providing downlink data to the UE. Additionally, or alternatively, the first timer may identify a length of time after which a PDCP of the source BS is to stop providing downlink data to an RLC layer of the source BS for transmission to the UE. In some aspects, after expiry of the first timer, the source BS may continue to transmit downlink data. For example, the source BS may continue to transmit downlink data until a buffer (e.g., an RLC buffer) of the source BS is cleared. As another example, the source BS may continue to transmit downlink data until a connection with the UE is ended or lost. As yet another example, the target BS may provide an indication to cause the source BS to end the connection.

As shown by reference number 415, the target BS may be associated with a second timer (e.g., timer 2). The second timer may identify a length of time during which the UE may receive downlink data from the source BS and the target BS. For example, the UE may receive redundant data from the source BS and the target BS between the RRC reconfiguration complete message and the SN status transfer message. After the SN status transfer message, the target BS may begin to provide downlink data to the UE. In some aspects, the first timer and/or the second timer may not be used. For example, when backhaul delay of the source BS and the target BS is small (e.g., less than approximately 3 to 5 ms), the first timer and/or the second timer may not be used, thereby conserving processor resources.

As shown by reference number 416, the target BS may provide a path switch request to an MME. The path switch request may indicate that a data path (e.g., a main path, a primary path, etc.) of the UE is to be switched from the source BS to the target BS. As shown by reference number 417, the MME may provide a modify bearer request to the S-GW based at least in part on the path switch request to cause the S-GW to switch the data path from the source BS to the target BS.

As shown, the S-GW may switch the data path from the source BS to the target BS. As further shown, the S-GW may provide a downlink end mark to the source BS indicating that the data path has been switched to the target BS. As shown, the source BS may provide the downlink end mark (or information based at least in part on the downlink end mark) to the target BS. At this point, and as shown, the S-GW may provide downlink data for the UE to the target BS, and the target BS may provide the downlink data to the UE (e.g., to the target protocol stack of the UE).

As shown by reference number 418, the S-GW may provide a modify bearer response to the MME in connection with the modify bearer request. As shown by reference number 419, the MME may provide a path switch request acknowledgment (ACK) to the target BS. The path switch request acknowledgment may indicate that the data path has been switched from the source BS to the target BS.

As shown by reference number 420, the target BS may provide, to the UE (e.g., the target protocol stack of the UE), an RRC connection reconfiguration message. The RRC connection reconfiguration message may indicate to release the source protocol stack. As further shown, the UE (e.g., the target protocol stack of the UE) may release the source protocol stack.

As shown by reference number 421, the target BS may provide a message to cause the source BS to release a UE context of the UE (e.g., the source protocol stack). The source BS may release the UE context in connection with the message. Thus, the target BS may cause the source BS to release the context (e.g., and/or a corresponding connection) with the UE. As shown by reference number 422, the UE may provide a message indicating that RRC reconfiguration is complete (e.g., that the release of the source BS is complete). For example, the target protocol stack of the UE may provide the message to indicate that handover to the target BS is complete.

As indicated above, FIGS. 4A and 4B are provided as examples. Other examples are possible and may differ from what was described with respect to FIGS. 4A and 4B.

Figure 5A:
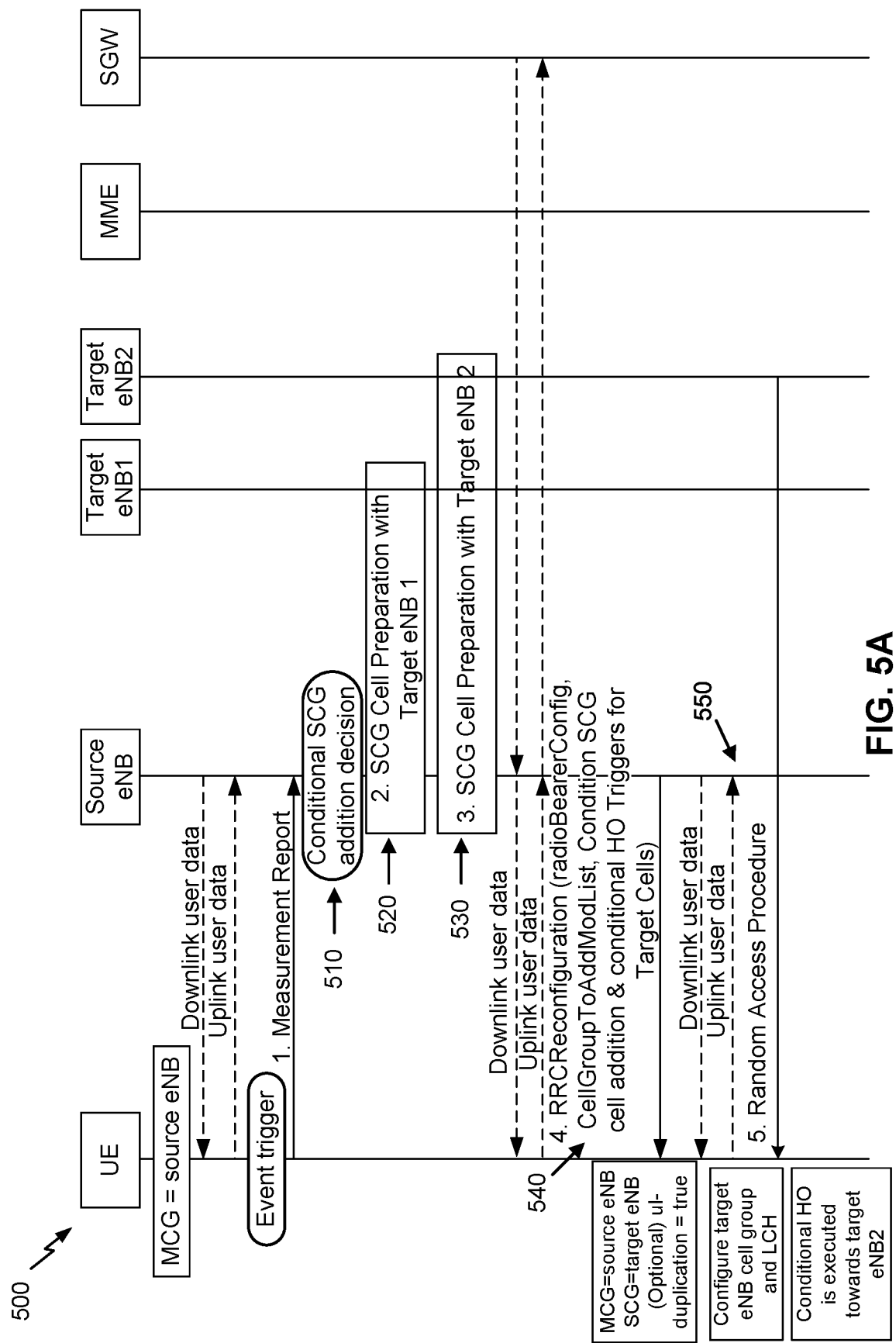
FIGS. 5A and 5B are diagrams of a call flow for performing a combination of handover techniques, in accordance with various aspects of the present disclosure.
Figure 5B:
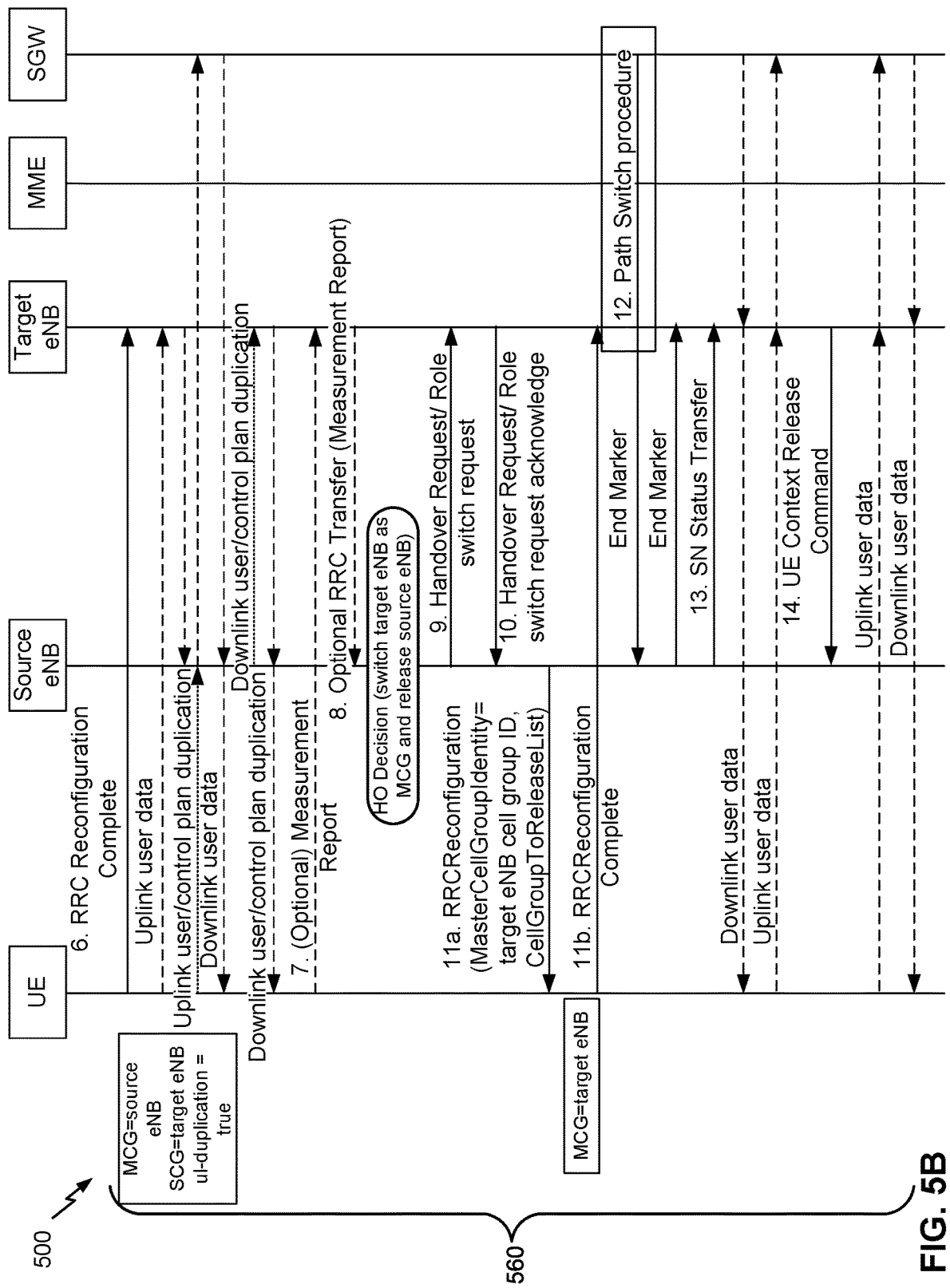

FIGS. 5A and 5B are diagrams of a call flow 500 for performing a combination of handover techniques, in accordance with various aspects of the present disclosure. Specifically, FIGS. 5A and 5B show an example of performing a combination of a conditional handover and a dual connectivity handover.

As shown in FIG. 5A, and by reference number 510, a source eNB (e.g., a source BS) may perform a conditional secondary cell group (SCG) addition decision. For example, the source eNB may determine target eNBs (e.g., target BSs) to include in a set of target eNBs from which the UE can connect to during a dual connectivity handover. As shown by reference numbers 520 and 530, the source eNB may perform SCG cell preparation with target eNBs included in the SCG (e.g., target eNB 1 and target eNB 2). For example, the source eNB may provide a UE context to the target eNBs and/or may cause the target eNBs to allocate resources for the dual connectivity handover, in a manner similar to that described elsewhere herein.

As shown by reference number 540, the source eNB may provide, to the UE, an RRC reconfiguration message. For example, the RRC reconfiguration message may indicate to the UE to use a combination of the conditional handover and the dual connectivity handover, may identify conditions that the UE is to use to select a target eNB and/or to initiate the dual connectivity handover, and/or the like.

As shown by reference number 550, and by reference number 560 in FIG. 5B, the UE may perform a dual connectivity handover of the UE from the source eNB to a target eNB.

As indicated above, FIGS. 5A and 5B are provided as examples. Other examples are possible and may differ from what was described with respect to FIGS. 5A and 5B.

Figure 6:
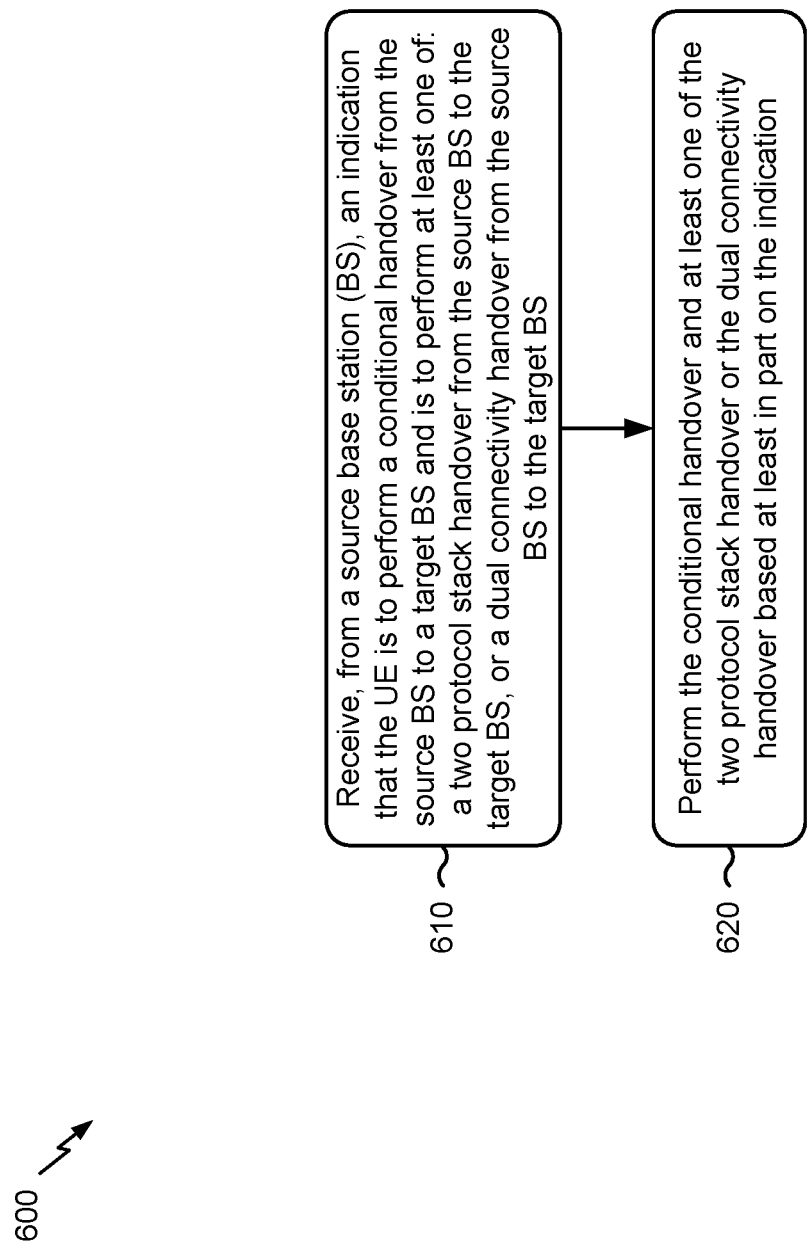
FIG. 6 is a diagram illustrating an example process performed, for example, by a user equipment, in accordance with various aspects of the present disclosure.

FIG. 6 is a diagram illustrating an example process 600 performed, for example, by a UE, in accordance with various aspects of the present disclosure. Example process 600 is an example where a UE (e.g., UE 120 and/or the like) performs operations associated with performing a combination of handover techniques.

As shown in FIG. 6, in some aspects, process 600 may include receiving, from a source BS, an indication that the UE is to perform a conditional handover from the source BS to a target BS and is to perform at least one of: a two protocol stack handover from the source BS to the target BS, or a dual connectivity handover from the source BS to the target BS (block 610). For example, the UE (e.g., using receive processor 258, controller/processor 280, memory 282, and/or the like) may receive, from a source BS, an indication that the UE is to perform a conditional handover from the source BS to a target BS and is to perform at least one of a two protocol stack handover from the source BS to the target BS or a dual connectivity handover from the source BS to the target BS, as described above.

As further shown in FIG. 6, in some aspects, process 600 may include performing the conditional handover and at least one of the two protocol stack handover or the dual connectivity handover based at least in part on the indication (block 620). For example, the UE (e.g., using receive processor 258, transmit processor 264, controller/processor 280, memory 282, and/or the like) may perform the conditional handover and at least one of the two protocol stack handover or the dual connectivity handover based at least in part on the indication, as described above.

Process 600 may include additional aspects, such as any single aspect or any combination of aspects described below and/or in connection with one or more other processes described elsewhere herein.

In a first aspect, the indication is included in a radio resource control (RRC) connection reconfiguration request from the source BS to the UE, and the RRC connection reconfiguration request further includes a set of conditions that the UE is to use to select the target BS.

In a second aspect, alone or in combination with the first aspect, performing the conditional handover comprises selecting the target BS based at least in part on a condition, of the set of conditions, being satisfied.

In a third aspect, alone or in combination with one or more of the first and second aspects, process 600 includes transmitting, to the source BS, capability information that identifies a capability of the UE to perform at least one of the conditional handover, the two protocol stack handover, or the dual connectivity handover, and receiving the indication comprises receiving the indication based at least in part on transmitting the capability information.

In a fourth aspect, alone or in combination with one or more of the first through third aspects, the indication is based at least in part on another indication from a mobility management entity (MME), and the other indication is based at least in part on at least one of: a type of application associated with the UE, a quality of service level associated with the UE, or an access point network (APN) type associated with a subscription profile of the UE.

In a fifth aspect, alone or in combination with one or more of the first through fourth aspects, the indication is based at least in part on a prioritization of different types of handovers by the source BS.

In a sixth aspect, alone or in combination with one or more of the first through fifth aspects, performing the conditional handover and at least one of the two protocol stack handover or the dual connectivity handover comprises: performing the conditional handover to select the target BS before releasing the source BS; and performing the two protocol stack handover to complete a handover of the UE from the source BS to the target BS while a source connection between the UE and the source BS and a target connection between the UE and the target BS are active.

In a seventh aspect, alone or in combination with one or more of the first through sixth aspects, performing the conditional handover and at least one of the two protocol stack handover or the dual connectivity handover comprises: performing the conditional handover to select the target BS; and performing the dual connectivity handover to complete a handover of the UE from the source BS to the target BS.

In an eighth aspect, alone or in combination with one or more of the first through seventh aspects, performing the conditional handover and at least one of the two protocol stack handover or the dual connectivity handover comprises performing a random access channel (RACH) procedure with the target BS before releasing the source BS.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
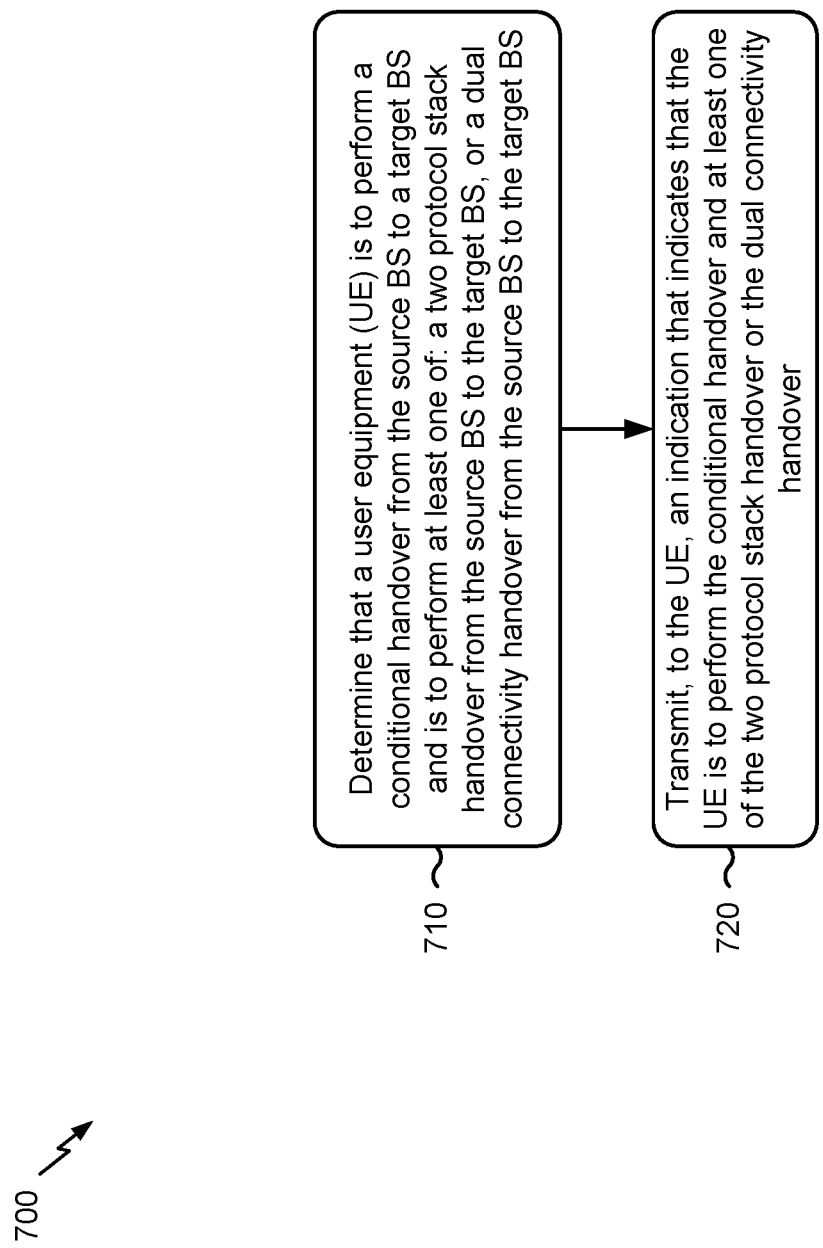
FIG. 7 is a diagram illustrating an example process performed, for example, by a base station, in accordance with various aspects of the present disclosure.

FIG. 7 is a diagram illustrating an example process 700 performed, for example, by a source BS, in accordance with various aspects of the present disclosure. Example process 700 is an example where a source BS (e.g., base station 110 and/or the like) performs operations associated with performing a combination of handover techniques.

As shown in FIG. 7, in some aspects, process 700 may include determining that a UE is to perform a conditional handover from the source BS to a target BS and is to perform at least one of: a two protocol stack handover from the source BS to the target BS, or a dual connectivity handover from the source BS to the target BS (block 710). For example, the source BS (e.g., using transmit processor 220, receive processor 238, controller/processor 240, memory 242, and/or the like) may determine that a UE is to perform a conditional handover from the source BS to a target BS and is to perform at least one of a two protocol stack handover from the source BS to the target BS or a dual connectivity handover from the source BS to the target BS, as described above.

As further shown in FIG. 7, in some aspects, process 700 may include transmitting, to the UE, an indication that indicates that the UE is to perform the conditional handover and at least one of the two protocol stack handover or the dual connectivity handover (block 720). For example, the source BS (e.g., using transmit processor 220, controller/processor 240, memory 242, and/or the like) may transmit, to the UE, an indication that indicates that the UE is to perform the conditional handover and at least one of the two protocol stack handover or the dual connectivity handover, as described above.

Process 700 may include additional aspects, such as any single aspect or any combination of aspects described below and/or in connection with one or more other processes described elsewhere herein.

In a first aspect, the indication is included in a radio resource control (RRC) connection reconfiguration request from the source BS to the UE, and the RRC connection reconfiguration request further includes a set of conditions that the UE is to use to select the target BS.

In a second aspect, alone or in combination with the first aspect, process 700 includes receiving, from the UE, capability information that identifies a capability of the UE to perform at least one of the conditional handover, the two protocol stack handover, or the dual connectivity handover, and determining that the UE is to perform the conditional handover and at least one of the two protocol stack handover or the dual connectivity handover comprises determining that the UE is to perform the conditional handover and at least one of the two protocol stack handover or the dual connectivity handover based at least in part on receiving the capability information.

In a third aspect, alone or in combination with one or more of the first and second aspects, process 700 includes receiving, from a mobility management entity (MME), another indication, and the other indication is based at least in part on: a type of application associated with the UE, a quality of service level associated with the UE, or an access point network (APN) type associated with a subscription profile of the UE; and the indication is further based at least in part on the other indication.

In a fourth aspect, alone or in combination with one or more of the first through third aspects, process 700 includes determining a priority of the at least one of the conditional handover, the two protocol stack handover, or the dual connectivity handover based at least in part on the other indication.

In a fifth aspect, alone or in combination with one or more of the first through fourth aspects, the indication indicates that the UE is to perform: a combination of the conditional handover and the two protocol stack handover, or a combination of the conditional handover and the dual connectivity handover.

In a sixth aspect, alone or in combination with one or more of the first through fifth aspects, process 700 includes performing a handover decision for the UE based at least in part on a measurement report received from the UE; determining that the UE is to perform the combination of the conditional handover and the two protocol stack handover or the combination of the conditional handover and the dual connectivity handover based at least in part on performing the handover decision; performing respective handover preparations with multiple target BSs, of a set of target BSs, based at least in part on determining to perform the combination of the conditional handover and the two protocol stack handover or the combination of the conditional handover and the dual connectivity handover; and transmitting the indication to the UE based at least in part on performing the respective handover preparations with the multiple target BSs.

In a seventh aspect, alone or in combination with one or more of the first through sixth aspects, process 700 includes transmitting, to the target BS, information that identifies whether the UE is to perform the combination of the conditional handover and the two protocol stack handover or the combination of the conditional handover and the dual connectivity handover.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:

receiving, from an apparatus of a source base station (BS), an indication that the UE is to perform a combination of a conditional handover and a two protocol stack handover from the apparatus of the source BS to an apparatus of a target BS,
  wherein the two protocol stack handover comprises the UE continuing downlink or uplink communication with the apparatus of the source BS via a source protocol stack in parallel with the UE performing radio resource control (RRC) processing to configure a handover via a target protocol stack, and
  wherein the indication is based at least in part on a prioritization of different types of handovers by the apparatus of the source BS; and
performing the conditional handover to select the apparatus of the target BS and the two protocol stack handover to complete the handover based at least in part on the indication.

2. The method of claim 1, wherein the indication is included in a RRC connection reconfiguration request from the apparatus of the source BS to the UE,
  wherein the RRC connection reconfiguration request further includes a set of conditions that the UE is to use to select the apparatus of the target BS.

3. The method of claim 2, wherein performing the conditional handover comprises selecting the apparatus of the target BS based at least in part on a condition, of the set of conditions, being satisfied.

4. The method of claim 1, further comprising transmitting, to the apparatus of the source BS, capability information that identifies a capability of the UE to perform at least one of the conditional handover, the two protocol stack handover, or a dual connectivity handover; and
  wherein receiving the indication comprises:
    receiving the indication based at least in part on transmitting the capability information.

5. The method of claim 1, wherein the indication is based at least in part on another indication from a mobility management entity (MME),
  wherein the other indication is based at least in part on at least one of:
    a type of application associated with the UE,
    a quality of service level associated with the UE, or
    an access point network (APN) type associated with a subscription profile of the UE.

6. The method of claim 1, wherein performing the conditional handover to select the apparatus of the target BS and the two protocol stack handover to complete the handover comprises:
  performing the conditional handover to select the apparatus of the target BS before releasing the apparatus of the source BS; and
  performing the two protocol stack handover to complete a handover of the UE from the apparatus of the source BS to the apparatus of the target BS while a source connection between the UE and the apparatus of the source BS and a target connection between the UE and the apparatus of the target BS are active.

7. The method of claim 1, wherein the UE is configured to perform another combination of handovers; and
  wherein performing the other combination of handovers comprises:
    performing the conditional handover to select the apparatus of the target BS; and
    performing a dual connectivity handover to complete a handover of the UE from the apparatus of the source BS to the apparatus of the target BS.

8. The method of claim 1, wherein the conditional handover and the two protocol stack handover comprise performing a random access channel (RACH) procedure with the apparatus of the target BS before releasing the apparatus of the source BS.

9. A method of wireless communication performed by an apparatus of a source base station (BS), comprising:
  determining that a user equipment (UE) is to perform a combination of a conditional handover and a two protocol stack handover from the apparatus of the source BS to an apparatus of a target BS,
    wherein the two protocol stack handover comprises the UE continuing downlink or uplink communication with the apparatus of the source BS via a source protocol stack in parallel with the UE performing radio resource control (RRC) processing to configure a handover via a target protocol stack, and
    wherein the determination is based at least in part on a prioritization of different types of handovers by the apparatus of the source BS; and
  transmitting, to the UE, an indication that indicates that the UE is to perform the conditional handover to select the apparatus of the target BS and the two protocol stack handover to complete the handover.

10. The method of claim 9, wherein the indication is included in a RRC connection reconfiguration request from the apparatus of the source BS to the UE,
  wherein the RRC connection reconfiguration request further includes a set of conditions that the UE is to use to select the apparatus of the target BS.

11. The method of claim 9, further comprising receiving, from the UE, capability information that identifies a capability of the UE to perform at least one of the conditional handover, the two protocol stack handover, or a dual connectivity handover; and
  wherein determining that the UE is to perform the combination of the conditional handover and the two protocol stack handover comprises:
    determining that the UE is to perform the combination of the conditional handover and the two protocol stack handover based at least in part on receiving the capability information.

12. The method of claim 9, further comprising:
  receiving, from a mobility management entity (MME), another indication,
    wherein the other indication is based at least in part on:
      a type of application associated with the UE,
      a quality of service level associated with the UE, or
      an access point network (APN) type associated with a subscription profile of the UE, and
    wherein the indication is further based at least in part on the other indication.

13. The method of claim 12, further comprising determining a priority of the at least one of the conditional handover, the two protocol stack handover, or a dual connectivity handover based at least in part on the other indication.

14. The method of claim 9, further comprising:
  performing a handover decision for the UE based at least in part on a measurement report received from the UE;
  determining that the UE is to perform the combination of the conditional handover and the two protocol stack handover based at least in part on performing the handover decision; and
  performing respective handover preparations with apparatuses of multiple target BSs, of a set of apparatuses of target BSs, based at least in part on determining to perform the combination of the conditional handover and the two protocol stack handover; and
  wherein transmitting the indication comprises:
    transmitting the indication to the UE based at least in part on performing the respective handover preparations with the apparatuses of multiple target BSs.

15. The method of claim 14, further comprising transmitting, to the apparatus of the target BS, information that identifies that the UE is to perform the combination of the conditional handover and the two protocol stack handover.

16. A user equipment (UE) for wireless communication, comprising:
  a memory; and
  one or more processors coupled to the memory, the one or more processors configured to:
    receive, from an apparatus of a source base station (BS), an indication that the UE is to perform a combination of a conditional handover and a two protocol stack handover from the apparatus of the source BS to an apparatus of a target BS,
      wherein the two protocol stack handover comprises the UE continuing downlink or uplink communication with the apparatus of the source BS via a source protocol stack in parallel with the UE performing radio resource control (RRC) processing to configure a handover via a target protocol stack, and
      wherein the indication is based at least in part on a prioritization of different types of handovers by the apparatus of the source BS; and
    perform the conditional handover to select the apparatus of the target BS and the two protocol stack handover to complete the handover based at least in part on the indication.

17. The UE of claim 16, wherein the indication is included in a RRC connection reconfiguration request from the apparatus of the source BS to the UE,
  wherein the RRC connection reconfiguration request further includes a set of conditions that the UE is to use to select the apparatus of the target BS.

18. The UE of claim 17, wherein the one or more processors, to perform the conditional handover, are configured to:
  select the apparatus of the target BS based at least in part on a condition, of the set of conditions, being satisfied.

19. The UE of claim 16, wherein the one or more processors are further configured to:
  transmit, to the apparatus of the source BS, capability information that identifies a capability of the UE to perform at least one of the conditional handover, the two protocol stack handover, or a dual connectivity handover; and
  wherein the one or more processors, to receive the indication, are configured to:
    receive the indication based at least in part on transmitting the capability information.

20. The UE of claim 16, wherein the indication is based at least in part on another indication from a mobility management entity (MME),
  wherein the other indication is based at least in part on at least one of:
    a type of application associated with the UE,
    a quality of service level associated with the UE, or
    an access point network (APN) type associated with a subscription profile of the UE.

21. The UE of claim 16, wherein the one or more processors, to perform the conditional handover to select the apparatus of the target BS and the two protocol stack handover to complete the handover, are configured to:
  perform the conditional handover to select the apparatus of the target BS before releasing the apparatus of the source BS; and
  perform the two protocol stack handover to complete a handover of the UE from the apparatus of the source BS to the apparatus of the target BS while a source connection between the UE and the apparatus of the source BS and a target connection between the UE and the apparatus of the target BS are active.

22. The UE of claim 16, wherein the UE is configured to perform another combination of handovers; and
  wherein the one or more processors, to perform the other combination of handovers, are configured to:
    perform the conditional handover to select the apparatus of the target BS; and
    perform a dual connectivity handover to complete a handover of the UE from the apparatus of the source BS to the apparatus of the target BS.

23. The UE of claim 16, wherein the one or more processors, to perform the conditional handover and the two protocol stack handover, are configured to:
  perform a random access channel (RACH) procedure with the apparatus of the target BS before releasing the apparatus of the source BS.

24. An apparatus of a source base station (BS) for wireless communication, comprising:
  a memory; and
  one or more processors coupled to the memory, the one or more processors configured to:
    determine that a user equipment (UE) is to perform a combination of a conditional handover and a two protocol stack handover from the apparatus of the source BS to an apparatus of a target BS,
      wherein the two protocol stack handover comprises the UE continuing downlink or uplink communication with the apparatus of the source BS via a source protocol stack in parallel with the UE performing radio resource control (RRC) processing to configure a handover via a target protocol stack, and
      wherein the determination is based at least in part on a prioritization of different types of handovers by the apparatus of the source BS; and
    transmit, to the UE, an indication that indicates that the UE is to perform the conditional handover to select the apparatus of the target BS and the two protocol stack handover to complete the handover.

25. The apparatus of the source BS of claim 24, wherein the one or more processors are further configured to:
  receive, from the UE, capability information that identifies a capability of the UE to perform at least one of the conditional handover, the two protocol stack handover, or a dual connectivity handover; and wherein the one or more processors, to determine that the UE is to perform the combination of the conditional handover and the two protocol stack handover, are configured to:
  determine that the UE is to perform the combination of the conditional handover and the two protocol stack handover based at least in part on receiving the capability information.

26. The apparatus of the source BS of claim 24, wherein the one or more processors are further configured to:
  perform a handover decision for the UE based at least in part on a measurement report received from the UE;
  determine that the UE is to perform the combination of the conditional handover and the two protocol stack handover based at least in part on performing the handover decision; and
  perform respective handover preparations with apparatuses of multiple target BSs, of a set of apparatuses of target BSs, based at least in part on determining that the UE is to perform the combination of the conditional handover and the two protocol stack handover; and
  wherein the one or more processors, to transmit the indication, are configured to:
    transmit the indication to the UE based at least in part on performing the respective handover preparations with the apparatuses of the multiple target BSs.

27. The apparatus of the source BS of claim 24, wherein the one or more processors are further configured to transmit, to the apparatus of the target BS, information that identifies that the UE is to perform the combination of the conditional handover and the two protocol stack handover.

28. The apparatus of the source BS of claim 24, wherein the indication is included in a RRC connection reconfiguration request from the apparatus of the source BS to the UE,
  wherein the RRC connection reconfiguration request further includes a set of conditions that the UE is to use to select the apparatus of the target BS.

29. The apparatus of the source BS of claim 24, wherein the one or more processors are further configured to:
  receive, from a mobility management entity (MME), another indication,
    wherein the other indication is based at least in part on:
      a type of application associated with the UE,
      a quality of service level associated with the UE, or
      an access point network (APN) type associated with a subscription profile of the UE, and
    wherein the indication is further based at least in part on the other indication.

30. The apparatus of the source BS of claim 29, wherein the one or more processors are further configured to determine a priority of the at least one of the conditional handover, the two protocol stack handover, or a dual connectivity handover based at least in part on the other indication.

* * * * *